(12) United States Patent
Pratt et al.

(10) Patent No.: US 7,563,537 B2
(45) Date of Patent: Jul. 21, 2009

(54) IONICALLY CONDUCTIVE CLAY ADDITIVE FOR USE IN ELECTROCHEMICAL CELLS

(75) Inventors: Paul Pratt, Lone Rock, WI (US); Stephanie R. Curtis, Pardeeville, WI (US); Rodney S. McKenzie, Madison, WI (US)

(73) Assignee: Rovcal, Inc., Madison, WI (US)

( * ) Notice: Subject to any disclaimer, the term of this patent is extended or adjusted under 35 U.S.C. 154(b) by 652 days.

(21) Appl. No.: 11/290,753

(22) Filed: Nov. 30, 2005

(65) Prior Publication Data

US 2007/0122709 A1   May 31, 2007

(51) Int. Cl.
*H01M 4/42* (2006.01)
*H01M 4/62* (2006.01)

(52) U.S. Cl. .................... 429/229; 429/232

(58) Field of Classification Search .......... 429/229, 429/232

See application file for complete search history.

(56) References Cited

U.S. PATENT DOCUMENTS

| | | |
|---|---|---|
| 3,336,145 A | 8/1967 | Purcell |
| 3,389,145 A | 6/1968 | Katz |
| 4,007,472 A | 2/1977 | Land |
| 4,042,760 A | 8/1977 | Land |
| 4,069,578 A | 1/1978 | Kinsman |
| 4,105,815 A | 8/1978 | Buckler |
| 4,119,770 A | 10/1978 | Land |
| 4,124,742 A | 11/1978 | Land et al. |
| 4,145,485 A | 3/1979 | Kinsman |
| 4,161,815 A | 7/1979 | Land et al. |
| 4,172,319 A | 10/1979 | Bloom et al. |
| 4,172,924 A | 10/1979 | Warszawski |
| 4,185,144 A | 1/1980 | Ames et al. |
| 4,288,913 A | 9/1981 | Parsen et al. |
| 4,345,954 A | 8/1982 | Panchu |
| 4,354,958 A | 10/1982 | Solomon |
| 4,361,633 A | 11/1982 | Nel et al. |
| 4,389,470 A | 6/1983 | Plasse |
| 4,400,452 A | 8/1983 | Bruder |

(Continued)

FOREIGN PATENT DOCUMENTS

EP   0518407 A2   12/1992

(Continued)

OTHER PUBLICATIONS

Coche-Guerente et al., *Amplification of Amperometric Biosensor Responses by Electrochemical Substrate Recycling. 3. Theoretical and Experimental Study of the Phenol-Polyphenol Oxidase System Immobilized in Laponite Hydrogels and Layer-by-Layer Self-Assembled Structures*, Anal. Chem. (2001) vol. 73, pp. 3206-3218.

(Continued)

*Primary Examiner*—Dah-Wei D Yuan
*Assistant Examiner*—Zachary Best
(74) *Attorney, Agent, or Firm*—Armstrong Teasdale LLP

(57) ABSTRACT

The present disclosure relates to alkaline electrochemical cells, such as metal-air cells, which comprise a gelled anode which may or may not include mercury, comprising an ionically conductive clay additive. The ionically conductive clay additive is modified to include halogen atoms to increase the negative charge density of the additive and improve its performance in the electrochemical cell.

21 Claims, 1 Drawing Sheet

U.S. PATENT DOCUMENTS

| | | | |
|---|---|---|---|
| 4,444,852 A | 4/1984 | Liu et al. | |
| 4,460,543 A | 7/1984 | Glaeser | |
| 4,518,705 A | 5/1985 | Solomon et al. | |
| 4,536,300 A | 8/1985 | Kayser et al. | |
| 4,539,275 A | 9/1985 | Plasse | |
| 4,608,325 A | 8/1986 | Ismail | |
| 4,609,597 A | 9/1986 | Plasse | |
| 4,614,026 A | 9/1986 | Plasse | |
| 4,615,954 A | 10/1986 | Solomon et al. | |
| 4,664,993 A | 5/1987 | Sturgis et al. | |
| 4,756,717 A | 7/1988 | Sturgis et al. | |
| 4,927,514 A | 5/1990 | Solomon et al. | |
| 4,957,826 A | 9/1990 | Cheiky | |
| 5,240,793 A | 8/1993 | Glaeser | |
| 5,308,711 A | 5/1994 | Passaniti et al. | |
| 5,342,712 A | 8/1994 | Mieczkowska et al. | |
| 5,378,562 A | 1/1995 | Passaniti et al. | |
| 5,407,500 A | 4/1995 | Forsberg et al. | |
| 5,419,987 A | 5/1995 | Goldstein et al. | |
| 5,424,145 A | 6/1995 | Tomantschger et al. | |
| 5,464,709 A | 11/1995 | Getz et al. | |
| 5,686,204 A | 11/1997 | Bennett et al. | |
| 5,744,258 A | 4/1998 | Bai et al. | |
| 5,758,374 A | 6/1998 | Ronci | |
| 6,207,322 B1 | 3/2001 | Kesley et al. | |
| 6,210,827 B1 | 4/2001 | Dopp et al. | |
| 6,347,033 B1 | 2/2002 | Minnick et al. | |
| 6,767,952 B2 | 7/2004 | Dontula et al. | |
| 6,780,347 B2 | 8/2004 | Ndzebet | |
| 6,927,000 B2 | 8/2005 | Ndzebet | |
| 2002/0177043 A1 * | 11/2002 | Ndzebet et al. | 429/229 |
| 2003/0113623 A1 | 6/2003 | Ndzebet | |
| 2003/0173548 A1 | 9/2003 | Ndzebet et al. | |
| 2004/0013940 A1 | 1/2004 | Horn | |
| 2004/0145344 A1 | 7/2004 | Bushong et al. | |
| 2005/0026031 A1 | 2/2005 | McKenzie et al. | |
| 2005/0074674 A1 | 4/2005 | Boone et al. | |

FOREIGN PATENT DOCUMENTS

| | | | |
|---|---|---|---|
| EP | 0700104 A1 | 3/1996 | |
| EP | 0755087 | 1/1997 | |
| EP | 0768723 | 4/1997 | |
| JP | 5868877 A2 | 4/1983 | |
| JP | 02174067 A * | 7/1990 | |
| NL | 7508697 | 7/1975 | |
| WO | WO 99/07030 A1 | 2/1999 | |
| WO | WO 99/50922 | 10/1999 | |
| WO | WO 02/13304 A1 | 2/2002 | |

OTHER PUBLICATIONS

Kirk-Othmer, Encyclopedia of Chemical Technology 4th Ed., vol. 5, pp. 599-633, John Wiley & Sons, Inc., New York, U.S., (1993).

Senilou et al., *A Laponite Clay-poly(pyrrole-pyridinium) Matrix for the Fabrication of Conductimetric Microbiosensors*, Anal. Chem. (1999) vol. 401, pp. 117-124.

Lacroix et al., *Modified Random Assembly of Microelectrodes for the Selective Electrochemical Detection of Dopamine*, Electroanalysis (1999) vol. 11, No. 14, pp. 1068-1076.

Lewis Richard J., Hawley's Condensed Chemical Dictionary 14th Ed. (2001), pp. 229, 274, 753, John Wiley & Sons, Inc., New York, U.S.

International Search Report from PCT/US02/15607 dated Sep. 17, 2002.

International Search Report and Written Opinion from PCT/US06/61296, dated Apr. 1, 2008.

* cited by examiner

IONICALLY CONDUCTIVE CLAY ADDITIVE FOR USE IN ELECTROCHEMICAL CELLS

FIELD OF THE DISCLOSURE

The present disclosure generally relates to alkaline electrochemical cells. More specifically, the present disclosure relates to alkaline electrochemical cells, such as metal-air cells, which comprise a gelled anode, which may or may not include mercury, comprising an ionically conductive clay additive. The ionically conductive clay additive is modified to include halogen atoms to increase the negative charge density of the clay additive and improve its performance in the electrochemical cell.

BACKGROUND OF THE DISCLOSURE

Electrochemical cells, commonly known as "batteries," are used to power a wide variety of devices used in everyday life. For example, devices such as radios, toys, cameras, flashlights, and hearing aids all ordinarily rely on one or more electrochemical cells to operate.

Electrochemical cells, such as metal-air electrochemical cells commonly utilized in hearing aids, produce electricity by electrochemically coupling in a cell a reactive gelled metallic anode, such as a zinc-containing gelled anode, to an air cathode through a suitable electrolyte, such as potassium hydroxide. As is known in the art, an air cathode is generally a sheet-like member having opposite surfaces that are exposed to the atmosphere and to an aqueous electrolyte of the cell, respectively. During operation of the cell, oxygen from the air dissociates at the cathode while metal (generally zinc) of the anode oxidizes, thereby providing a usable electric current flow through the external circuit between the anode and the cathode.

Many metallic-based gelled anodes are thermodynamically unstable in an aqueous neutral or alkaline electrolyte and can react with the electrolyte to corrode or oxidize the metal and generate hydrogen gas. This corrosive self-discharge side reaction can reduce both service and shelf life of electrochemical cells that use zinc as the anodic fuel. During discharge, electrochemical oxidation occurs at the anode, and metallic zinc is oxidized to zinc hydroxide, zincate ions, or zinc oxide. Under conditions such as high discharge rates or low electrolyte concentration, where the product of discharge is too densely attached to the surface, passivation of the zinc can occur. The presence of a solid phase zinc oxide or hydroxide film can interfere with the discharge efficiency of the zinc-based anode.

To combat these problems, mercury has conventionally been added to the zinc-based anode to improve the corrosion resistance and discharge behavior of the anode. Additionally, technologies aimed at substituting other components for mercury have been developed. With these technologies, small amounts of lead, calcium, indium, bismuth, and combinations thereof have been combined with zinc to provide a zinc alloy. Unfortunately, it has been shown that many of these alternative materials (i.e., mercury-free) tend to exhibit a drop in both operating voltage and service life as compared to zinc anodes containing a mercury additive. These limitations may be especially noticeable when the cell is discharged at a high rate. This is most likely due to either zinc particle surface passivation, caused by zinc oxide forming at the zinc surface, and/or anode polarization. These may both be caused by the lack of a sufficient quantity of hydroxyl ions in the anode, and/or a sufficiently even distribution of hydroxyl ions.

To improve the performance of an electrochemical cell in the absence of mercury in the anode, it has been suggested in U.S. Patent Application No. 2002/0177043A1 to introduce an ionically conductive clay additive into the zinc-containing anode. The ionically conductive clay material improves the transport of hydroxyl ions inside the zinc anode matrix during a discharge resulting in increased electrochemical cell performance. One suitable ionically conductive clay additive is the synthetic clay Laponite® ($Na_{0.70}{}^{0.7+}[(Si_8Mg_{5.5}Li_{0.3})O_{20}(OH)_4]^{0.7-}$). Although ionically conductive clay additives such as Laponite® in the zinc-containing anode have generally improved performance, there continues to be a need to improve performance of the electrochemical cell over long periods of time.

As such, it would be desirable to provide an electrochemical cell comprising an additive that can be used with or without mercury addition to extend the service life and performance of the electrochemical cell. It would also be desirable for the additive and electrochemical cell to be stable over long periods of time to improve shelf life and performance.

SUMMARY OF THE DISCLOSURE

The present disclosure provides an electrochemical cell having improved service life and extended shelf life. The cell includes a gelled anode comprising a gelling agent, an anode active material comprising zinc, and an ionically conductive clay additive. The ionically conductive clay additive is dispersed throughout the gelled anode, and improves the transport of hydroxyl ions into the gelled anode during discharge. In one embodiment, the ionically conductive clay additive comprises at least about 25,000 ppm of a halogen. In another embodiment, the ionically conductive clay additive has a cationic exchange capacity of at least about 70 milliequivalents/100 grams. In another embodiment, the ionically conductive clay additive comprises at least about 25,000 ppm of a halogen and has a cationic exchange capacity of at least about 70 milliequivalents/100 grams. The electrochemical cell possesses relatively greater ionic and electronic conductivity, lower initial voltage dip, and higher overall operating voltage.

As such, the present disclosure is directed to an electrochemical cell comprising a gelled anode comprising a gelling agent, an anode active material comprising zinc, and an ionically conductive clay additive that is dispersed throughout the gelled anode, wherein the ionically conductive clay additive is present in an amount of from about 0.1% (by weight anode blend) to about 3% (by weight anode blend) and wherein the ionically conductive clay additive comprises at least about 25,000 ppm of a halogen.

The present disclosure is further directed to an electrochemical cell comprising a gelled anode comprising a gelling agent, an anode active material comprising zinc, and an ionically conductive clay additive that is dispersed throughout the gelled anode, wherein the ionically conductive clay additive is present in an amount of from about 0.1% (by weight anode blend) to about 3% (by weight anode blend) and wherein the ionically conductive clay additive has a cationic exchange capacity of at least about 70 milliequivalents/100 grams.

The present disclosure is further directed to an electrochemical cell comprising a gelled anode comprising a gelling agent, an anode active material comprising an amalgamated zinc composition comprising zinc and mercury, an ionically conductive clay additive that is dispersed throughout the gelled anode, and an electrolyte solution, the electrolyte solution comprising water, an alkaline solution, a suspending agent, a surfactant, and zinc oxide, wherein the ionically conductive clay additive is present in an amount of from about 0.1% (by weight anode blend) to about 3% (by weight anode blend), wherein the ionically conductive clay additive comprises at least about 25,000 ppm of fluorine, and wherein the ionically conductive clay additive has a cationic exchange capacity of at least about 70 milliequivalents/100 grams.

DETAILED DESCRIPTION OF THE DISCLOSURE

Figure 1:
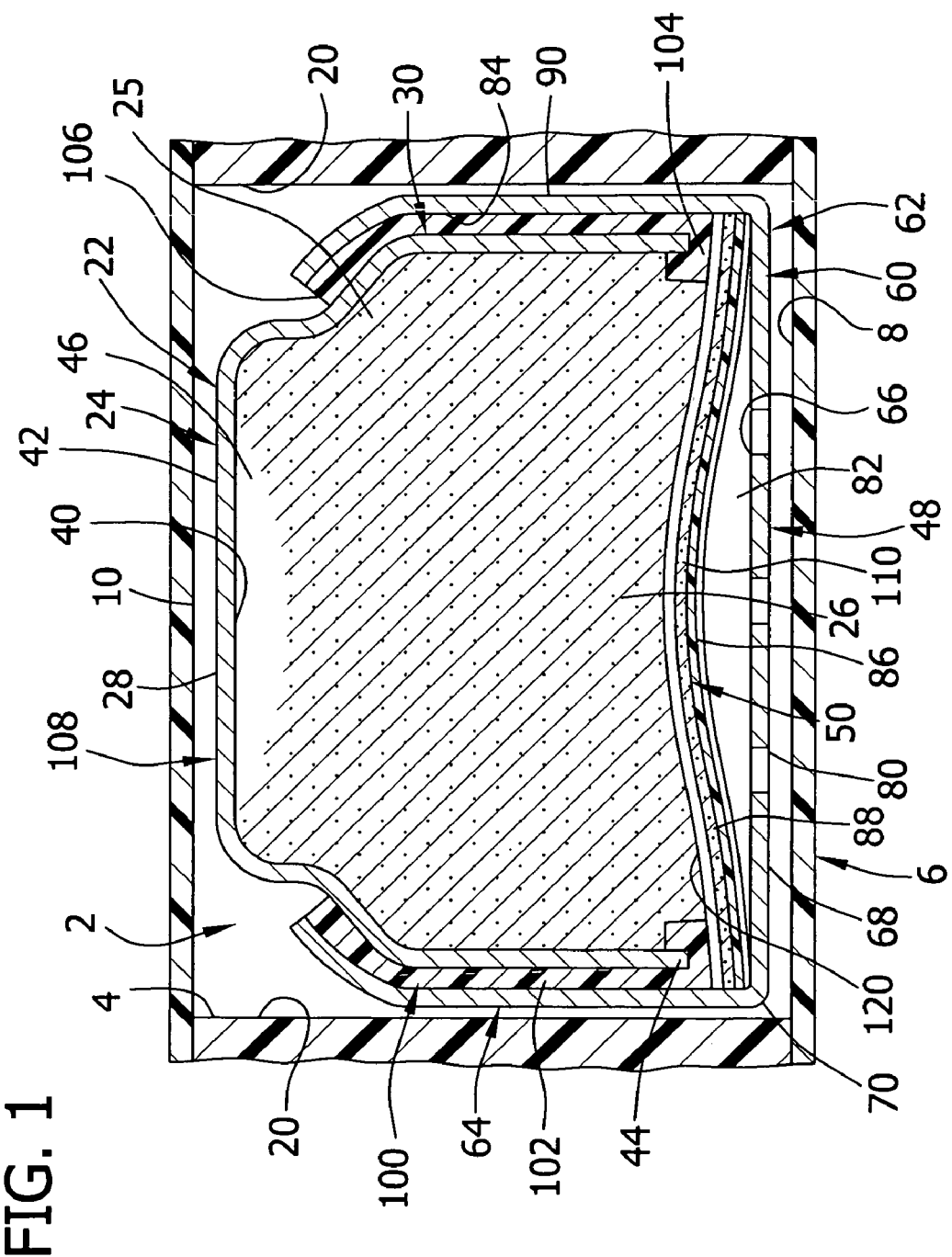
FIG. 1 is a schematic sectional side elevational view of a conventional metal-air button cell constructed in accordance with one embodiment of the present disclosure.

The present disclosure is generally directed to electrochemical cells having a gelled anode including an anode active material comprising zinc, a gelling agent, and an ionically conductive clay additive. The ionically conductive clay additives suitable for use in the gelled anodes described herein are synthetically modified ionically conductive clay additives that have been modified to increase their overall negative charge density as compared to conventional ionically conductive clay additives, which leads to an increase in conductivity when utilized in the gelled anodes described herein. Surprisingly, it has been discovered that modified ionically conductive clay additives comprising at least a certain level of halogen atoms or at least a certain level of cationic exchange capacity significantly increase the overall performance of an electrochemical cell that incorporates the modified ionically conductive clay additive into the anode.

Referring now to FIG. 1, a conventional metal-air cell, and in particular a conventional button cell 2, is deposited in a battery cavity 4 of an appliance 6. The cavity 4 is generally bounded by a bottom wall 8, a top wall 10, and side walls 20.

The negative electrode of the cell 2, commonly known as the anode 22, includes an anode can 24 defining an anode/electrolyte chamber 25, which contains a gelled anode 26 comprising a gelling agent, an anode active material and other additives, and an alkaline electrolyte comprising an alkaline electrolyte solution and other additives, each of which is discussed in further detail below. Conventional anodes typically consist of a zinc paste anode active material, and may be positioned in the manner described in, for example, U.S. patent application Ser. No. 10/944,036, which is hereby incorporated by reference as if set forth in its entirety herein.

The anode can 24 has a top wall 28 and an annular downwardly-depending side wall 30. Top wall 28 and side wall 30 have, in combination, an inner surface 40 and an outer surface 42. Side wall 30 terminates in an annular can foot 44, and defines a cavity 46 within the anode can 24, which contains the gelled anode 26.

The positive electrode of the cell 2, commonly known as the cathode 48, includes a cathode assembly 50 contained within a cathode can 60. Cathode can 60 has a bottom 62 and an annular upstanding side wall 64. Bottom 62 has a generally flat inner surface 66, a generally flat outer surface 68, and an outer perimeter 70 defined on the flat outer surface 68. Side wall 64 of the cathode can has an inner surface 84 and an outer surface 90. Suitable air cathodes for use in the present disclosure are described in U.S. Pat. Nos. 5,378,562, 5,308,711, and 6,780,347, each of which is hereby incorporated by reference as if set forth in its entirety, and mixtures of any of the foregoing. One or more air ports 80 extend through the bottom 62 of the cathode can 60 to provide avenues for air to flow into the cathode 48. An air reservoir 82 spaces the cathode assembly 50 from the bottom 62 and the corresponding air ports 80. A porous air diffusion layer 86 occupies the air reservoir 82, and presents an outer reaction surface 88 for the oxygen. It should be appreciated by those of skill in the art that an air mover, not shown, could additionally be installed to assist in air circulation.

The cathode assembly 50 includes an active layer 110 that is interposed between a separator 120 and the air diffusion layer 86. Active layer 110 reduces the oxygen from the air, consuming the electrons produced by the reaction at the anode 22. Separator 120 has the primary function of preventing anodic zinc particles from coming into physical contact with the elements of the cathode assembly 50. Separator 120, however, does permit passage of hydroxyl ions and water therethrough between the anode 22 and the cathode assembly 50. The separator 120 is preferably a microporous membrane, typically wettable polypropylene. Other suitable separator materials are described in U.S. patent application Ser. No. 10/914,934, the contents of which is hereby incorporated by reference as if set forth in its entirety.

The anode 22 is electrically insulated from the cathode 48, via the seal 100, that includes an annular side wall 102 disposed between the upstanding side wall 64 of the cathode can 60 and the downwardly-depending side wall 30 of the anode can 24. A seal foot 104 is disposed generally between the can foot 44 of the anode can 24 and the cathode assembly 50. A seal top 106 is positioned at the locus where the side wall 102 of the seal 100 extends from between the side walls 30 and 64 adjacent to the top of the cell 2.

Generally, the seal 100 is of single-piece construction. For example, the seal 100 may be molded of nylon 6,6 which has been found to be inert to the alkaline electrolyte contained in the gelled anode 26, and yet also sufficiently deformable upon compression to function as a seal against the inside wall 84 of the cathode can 60. It is contemplated that the seal 100 may alternatively be formed of other suitable materials, including without limitation polyolefin, polysulfone, polypropylene, filled polypropylene (e.g., talc-filled polypropylene), sulfonated polyethylene, polystyrene, impact-modified polystyrene, glass filled nylon, ethylene-tetrafluoroethylene copolymer, high density polypropylene and other insulating materials. One particular example of a suitable glass filled nylon material for use in forming the sealing assembly is disclosed in co-assigned U.S. Patent Publication No. 2004/0145344, the disclosure of which is incorporated herein by reference to the extent that it is consistent.

The outer surface 108 of the cell 2 is thus defined by portions of the outer surface 42 of the top of the anode can 24, outer surface 90 of the side wall 64 of the cathode can 60, outer surface 68 of the bottom 62 of the cathode can 60, and the top 106 of seal 100.

As noted above, the present disclosure is directed to an electrochemical cell having, for example, the above-described configuration. More specifically, the present disclosure is directed to an electrochemical cell comprising a gelled anode comprising a gelling agent, an anode active material comprising zinc, and an ionically conductive clay additive that is dispersed throughout the gelled anode and present in an amount effective to improve the transport of hydroxyl ions into the gelled anode during discharge. Additional components such as mercury or other corrosion inhibitors, an electronic conducting polymer, and an electrolyte, which includes an alkaline electrolyte solution, a suspending agent, and a surfactant, may also be included in the anode as described herein. Generally speaking, the gelled anode of the present disclosure may be fabricated by first preparing an electrolyte, then preparing the coated metal anode, and finally combining the electrolyte and the coated metal anode.

The Electrolyte Fabrication Process

The electrolyte fabrication process typically involves forming the electrolyte solution comprising water, an alkaline solution, a suspending agent, a surfactant, and zinc oxide. Suitable alkaline solutions include aqueous solutions of potassium hydroxide, sodium hydroxide, lithium hydroxide, and combinations thereof. Generally, the electrolyte solution comprises from about 20% (by weight) to about 50% (by weight), and desirably from about 25% (by weight) to about 40% (by weight) alkaline solution.

The electrolyte fabrication process also includes introducing a suspending agent into the electrolyte solution. The suspending agent is present in the electrolyte solution to suspend the surfactant present therein. The suspending agent can be any suspending agent that is known to be used in electrochemical cells. Suitable suspending agents include, for example, carboxymethylcellulose (CMC), polyacrylic acid, and sodium polyacrylate (e.g., some of those under the Carbopol® trademark, which are commercially available from Noveon, Inc., Cleveland, Ohio). The suspending agent is typically present in the electrolyte solution at a concentration of from about 0.05% (by weight) to about 1% (by weight), desirably about 0.1% (by weight) electrolyte solution. In a particularly preferred embodiment, the suspending agent is a non-crosslinked polymeric material, or a low-crosslinked polymeric material, such that in use, it is substantially non-rigid and has long-flow properties.

The electrolyte fabrication process also includes adding a surfactant to the electrolyte solution. Preferably, the surfactant is an oxazoline surfactant. Suitable oxazoline surfactants can be dispersed in an anode-compatible electrolyte during the electrolyte fabrication process, or can be suspended under the anode fabrication process. U.S. Pat. No. 3,389,145, incorporated by reference herein as if set forth in its entirety, discloses structures of one suitable set of oxazolines and processes for making the same. Also suitable for use in the gelled anode of the present disclosure are substituted oxazoline surfactants having the structures shown in U.S. Pat. Nos. 3,336,145, 4,536,300, 5,758,374 and 5,407,500, each of which is hereby incorporated by reference as if set forth in its entirety, and mixtures of any of the foregoing. A most preferred oxazoline surfactant, ethanol, 2,2'-[(2-heptadecyl-4 (5H)-oxazolylidine) bis (methyleneoxy-2,1-ethanediyloxy)] bis, has a structure shown as Formula (I-2) in incorporated U.S. Pat. No. 5,407,500. This is a compound commercially available from Angus Chemical (Northbrook, Ill.) and sold under the trademark Alkaterge™ T-IV. Preferably, the surfactant is present at a concentration of from about 0.1% (by weight) to about 1% (by weight), and desirably about 0.2% (by weight) electrolyte solution.

The electrolyte fabrication process additionally includes adding zinc oxide to the electrolyte solution. Specifically, the zinc oxide is present in the electrolyte solution to reduce dendrite growth, which reduces the potential for internal short circuits by reducing the potential for separator puncturing. Although preferred, in any of the embodiments described herein, the zinc oxide need not be provided in the electrolyte solution, as an equilibrium quantity of zinc oxide is ultimately self-generated in situ over time by the exposure of zinc to the alkaline environment and the operating conditions inside the cell, with or without the addition of zinc oxide per se. The zinc used in forming the zinc oxide is drawn from the zinc already in the cell, and the hydroxide is drawn from the hydroxyl ions already in the cell. Where zinc oxide is added to the electrolyte solution, the zinc oxide is preferably present in an amount of from about 0.5% (by weight) to about 4% (by weight), desirably about 2% (by weight) electrolyte solution.

In an exemplary embodiment, the electrolyte solution comprises an alkaline solution comprising potassium hydroxide in water, zinc oxide, a suspending agent, and a surfactant. In a particularly preferred embodiment, the electrolyte solution comprises potassium hydroxide in water (30-50% by weight), zinc oxide, a polyacrylic acid suspending agent, and an oxazoline surfactant.

The Coated Metal Anode Fabrication Process

The coated metal anode fabrication process typically involves mixing an anode active material, which typically comprises zinc, a gelling agent, and an ionically conductive clay additive. Additionally, other components such as a wetting agent, an electronic conducting polymer, or a corrosion inhibitor may optionally be added to produce the coated metal anode.

In general, the anode active material, which is typically in particulate metal alloy form as a powder, can be any suitable anode active material that is known to be used in electrochemical cells having an aqueous alkaline environment. Preferably, the metal alloy powder is a zinc-containing powder. In one specific embodiment, the surface of the zinc powder is amalgamated with mercury to produce a zinc-mercury alloy according to the process described in U.S. Pat. No. 4,460,543 to Glaeser, the contents of which is hereby incorporated by reference as if set forth in its entirety. According to this process, zinc powder is mixed with metallic mercury in the presence of an amalgamation aid in a closed system at a partial pressure of oxygen below 100 mbar. The amalgamation aid is typically a substance that is suitable for dissolving the oxide layer of the zinc powder and preventing the formation of an oxide layer on the mercury. During the amalgamation process, the excess amalgamation aid, water vapor, and other volatile products are preferably continuously removed from the closed system. To complete the process, the partial pressure of oxygen is raised to atmospheric pressure. The mercury present in the amalgamation acts to passivate the zinc particles which generally results in reduced anode gassing and improved efficiency.

During the amalgamation process, the mercury penetrates through the surface of the zinc powder and into the zinc powder particles and is distributed therein through diffusion. Smaller zinc powder particles have a correspondingly larger surface area per unit volume, and due to their increased contribution to gassing, have more mercury available for the passivation of impurities on the surface than do larger particles. As a result of the absorption of mercury by the surface of the zinc powder, there is initially a stronger coating of mercury on the surface of the zinc, i.e., where the mercury is specifically needed. This effect is increased through the use of certain amalgamation aids, such as soda lye, potash lye, hydrochloric acid, acetic acid, formic acid, carbonic acid, and ammonia. According to the amalgamation process, the zinc powder is preferably mixed with an alloying element which has been pre-dissolved in metallic mercury to further reduce gas development and improve corrosion resistance. These alloying elements include gold, silver, tin, lead, cadmium, indium, thallium, and gallium. As such, the mercury-amalgamated zinc alloy may additionally contain one or more of these alloying elements. A preferred element is lead.

Typically, the zinc powder used in the anode fabrication process is zinc powder that has been amalgamated with greater than about 0.5 parts mercury per 100 parts zinc. Desirably, the zinc powder has been amalgamated with less than about 6.0 parts mercury per 100 parts zinc. More preferably, the zinc powder has been amalgamated with from about 1 part mercury per 100 parts zinc to about 5 parts mercury per 100 parts zinc, and desirably from about 2 parts mercury per 100 parts zinc to about 4 parts mercury per 100 parts zinc. In a particularly preferred embodiment, the zinc powder has been amalgamated with about 2.4 parts mercury per 100 parts zinc.

In another embodiment, the zinc alloy comprises zinc, mercury, and lead. Desirably, mercury is present in an amount of from about 1 part mercury per 100 parts zinc to about 5 parts mercury per 100 parts zinc, and lead is present in an amount of from about 100 ppm to about 1000 ppm, desirably about 500 ppm.

The zinc powder utilized typically has a mean particle size of from about 200 to about 400 micrometers. Generally, the median particle size of the zinc powder is about 200 to about 300 micrometers. The zinc powder typically has an apparent density in the range of about 2 to about 4 gram/cm$^3$ and a flow rate of less than about 70 seconds and desirably less than about 50 seconds. One method for the measurement of the apparent density of the zinc powder is ASTM B 212-99 "Standard Test Method for Apparent Density of Free-Flowing Metal Powders Using the Hall Flowmeter Funnel," ASTM International. One method for the measurement of the flow rate of the zinc powder is ASTM B 213-03 "Standard Test Method for Flow Rate of Metal Powders," ASTM International.

During fabrication of the anode, a gelling agent is added, typically in dry powder form, and mixed with the zinc alloy. The gelling agent acts to support the electrolyte and the anode active material (typically zinc-containing) in the gelled anode. The gelling agent also increases the distribution of the electrolyte throughout the anode, and reduces zinc self-plating, which can result in undesirable hardening of the anode.

The gelling agent present in the anode can be any gelling agent that is known to be used in electrochemical cells. Suitable gelling agents include, for example, carboxymethylcellulose (CMC), polyacrylic acid, and sodium polyacrylate (e.g., those under the Carbopol® trademark, which are commercially available from Noveon, Inc., Cleveland, Ohio). Desirably, the gelling agent is a chemical compound that has negatively charged acid groups. One particularly preferred gelling agent is Carbopol® 934, commercially available from Noveon, Inc., Cleveland, Ohio. Carbopol® 934 is a long chain polymer with acid functional groups along its backbone. The function of these acid groups on the gelling agent is to expand the polymer backbone into an entangled matrix. When these acid groups are ionized in the anode, they repel each other and the polymer matrix swells to provide a support mechanism. Other preferred gelling agents are Carbopol® Ultrez 21 and Carbopol® Ultrez 10, which are self-wetting hydrophobic polymers that are easy to disperse.

Typically, the gelling agent is present in the coated zinc anode at a concentration of less than about 5.0% (by weight anode blend). Preferably, the gelling agent is present in the coated zinc anode at a concentration of greater than about 0.5% (by weight anode blend). More preferably, gelling agent is present in the coated zinc anode at a concentration of from about 0.1% (by weight anode blend) to about 3% (by weight anode blend). Most preferably, the gelling agent is present in the coated zinc anode at a concentration of from about 0.2% (by weight anode blend) to about 2% (by weight anode blend).

Added to the anode active material and gelling agent is an ionically conductive clay additive. Generally, this additive is in powder form. The ionically conductive clay additive is preferably an ionically conductive clay additive that advantageously exhibits high stability in concentrated alkaline electrolytes, and has substantially no effect on the gassing behavior of the zinc used as the anode active material in alkaline electrochemical cells. Additionally, because the ionically conductive clay is insoluble in an aqueous alkaline or neutral electrolyte solution, dispersed clay particles throughout the anode form an ionic network that enhance the transport of hydroxyl ions through the matrix formed by the gelling agent.

The ionically conductive clay additives suitable for use in the anode of the present disclosure are synthetically modified ionically conductive clay additives. Either natural or synthetic clays can be synthetically modified to produce ionically conductive clay additives suitable for use in the present disclosure. Generally, natural or synthetic clay materials suitable for synthetic modification typically have a hydroxide group, a particle charge, and at least one of aluminum, lithium, magnesium and silicon. Specifically, natural or synthetic clays such as, for example, kaolinite clays, montmorillonite clays, smectite clays, illiet clays, bentonite clays, hectorite clays, and combinations thereof may be suitable for synthetic modification and use in the anodes and electrochemical cells described herein.

The clay additives are synthetically modified to increase their negative charge density on the surface. This increase in negative charge density allows for a significant increase in the interaction with the gelling agents described above, and allows a polymer matrix to build a solid structure that will provide additional support from within the gelling agent matrix after the acid groups are ionized. This results in an increase in the overall conductivity of the anode.

Ionically conductive clay additives suitable for use in the present disclosure have been chemically modified to introduce halogen atoms into the chemical structure of the additive. These halogen atoms typically replace the hydroxide ions present in the ionically conductive clay additive to increase the negative charge density of the modified ionically conductive clay additive. Generally, the higher the modification (i.e., the more halogen atoms introduced into the structure to replace hydroxide ions), the greater the increase in charge density. Although any halogen atom (i.e., fluorine, chlorine, bromine, iodine or astatine) can be introduced alone or in combination to increase the charge density of the modified ionically conductive clay additive, fluorine is generally preferred.

The modified ionically conductive clay additives suitable for use in the anodes and electrochemical cells of the present disclosure include an increased amount of halogen atoms as compared to conventional ionically conductive clay additives. Generally, to be suitable for use in the anodes and electrochemical cells of the present disclosure, the modified ionically conductive clay additive will have a concentration of halogen atoms of at least about 25,000 ppm, more desirably at least about 50,000 ppm, still more desirably at least about 80,000 ppm and most desirably at least about 100,000 ppm or more. In one particularly preferred embodiment, the modified ionically conductive clay additive comprises at least about 50,000 ppm fluorine, desirably at least about 80,000 ppm fluorine, still more desirably at least about 100,000 ppm fluorine, and most desirably at least about 120,000 ppm fluorine.

Modified ionically conductive clay additives including substituted halogen atoms suitable for use in the anodes and electrochemical cells of the present disclosure may also be characterized in terms of their cationic exchange capacity. The cationic exchange capacity of the ionically conductive clay additive is the quantity of positively charged ions (i.e., cations) that the clay additive can accommodate on its negatively charged surface, expressed as milliequivalents per 100 grams of clay material. As the cationic exchange capacity of the ionically conductive clay additive increases, so does its ability to enhance the ionic and electric conductivity within the electrochemical cell and improve the transport of alkaline electrolyte between the cathode and the anode.

Suitable modified ionically conductive clay additives have a cationic exchange capacity of at least about 70 milliequivalents/100 grams, desirably at least about 80 milliequivalents/100 grams, more desirably at least about 90 milliequivalents/100 grams, still more desirably at least about 100 milliequivalents/100 grams, still more desirably at least about 110 milliequivalents/100 grams, and still more desirably at least about 120 milliequivalents/100 grams of ionically conductive clay additive. The cationic exchange capacity of the modified ionically conductive clay additive can easily be determined by one skilled in the art using, for example, a titrimetric procedure using methylene blue as the indicating agent. The methylene blue is cationic and will exchange with the sodium at the surface of the crystal. The absorbed methylene blue results in the precipitation of the crystal/methylene blue complex. Once the solution demonstrates the first sign of color (free methylene blue), the end point is reached.

Specifically, suitable modified ionically conductive clay additives for use in the anodes and electrochemical cells as described herein include, for example, SR 2478 and SR 2477, both commercially available from Rockwood Specialties Inc., Princeton, N.J. SR 2478 is a fluorinated Laponite® clay additive that has a cationic exchange capacity of about 95-100 milliequivalents/100 grams. SR 2477 is also a fluorinated Laponite® clay additive that has a cationic exchange capacity of about 120-130 milliequivalents/100 grams. As compared to Laponite® RD (non-fluorinated Laponite® ionically conductive clay additive having the empirical formula $(Na_{0.70}{}^{0.7+}[(Si_8Mg_{5.5}Li_{0.3})O_{20}(OH)_4]^{0.7-})$ that has a cationic exchange capacity of about 55-60 milliequivalents/100 grams, the fluorinated ionically conductive clay additives have a much greater cationic exchange capacity; that is, the fluorinated ionically conductive clay additives have significantly increased negative surface charge density.

Typically, the modified ionically conductive clay additive is present in the coated zinc anode at a concentration of from about 0.1% (by weight anode blend) to about 3% (by weight anode blend). Desirably, the modified ionically conductive clay additive is present in the coated zinc anode at a concentration of from about 0.1% (by weight anode blend) to about 1% (by weight anode blend); more desirably from about 0.1% (by weight anode blend) to about 0.3% (by weight anode blend).

Along with the gelling agent, anode active material, and ionically conductive clay additive, magnesium oxide may optionally be added in dry powder form during the coated metal anode fabrication. Magnesium oxide may be introduced into the anode to improve the self-wetting properties of the anode upon combination with the electrolyte; that is, the magnesium oxide helps to soak electrolyte into the anode by wicking the electrolyte into the anode. This wicking action helps to evenly distribute the electrolyte through the anode. Typically, magnesium oxide (or other suitable wetting agents, when utilized) is present in the coated metal anode at a concentration of from about 0.1% (by weight anode blend) to 4% (by weight anode blend). Desirably, magnesium oxide (or other suitable wetting agents, when utilized) is present in the coated metal anode at a concentration of about 2% (by weight anode blend).

An electronic conducting polymer may also optionally be added to the coated metal anode to improve its properties. The electronic conducting polymer generally promotes increased electronic conductivity between zinc particles, and provides increased ionic conductivity in the electrolyte. The electronic conducting polymer additionally decreases the voltage dip upon initial discharge, eliminates impedance during discharge, and produces higher overall operating voltage.

Preferably, the electronic conducting polymer is polyaniline. Other electronic conducting polymers such as polypyrrole, polyacetylene, and combinations thereof may also be used. Typically, the electronic conducting polymer is added to the zinc alloy at 2 parts for every 3 parts of the gelling agent.

Small amounts of one or more corrosion inhibitors may also optionally be added to the coated metal anode. The corrosion inhibitor added to the anode can be any corrosion inhibitor that is known to be used in electrochemical cells. Typically, the corrosion inhibitor is a substance known to improve the corrosion behavior of anodic zinc. Suitable corrosion inhibitors include, for example, tannic acid, aluminum, indium, lead, bismuth, and combinations thereof.

It is contemplated that the above-described coated zinc anode components used in the anode fabrication process may be combined in any particular order. For example, the ionically conductive clay additive may be added to the zinc alloy prior to adding the gelling agent, and/or the magnesium oxide, and/or the electronic conducting polymer, if any. Alternatively, the ionically conductive clay additive can be added to the alkaline electrolyte at any point during the electrolyte fabrication process, described above.

In one specific embodiment, the combined dry mixture of the anode active material comprising zinc amalgamated with mercury, gelling agent, ionically conductive clay additive, and magnesium oxide, are dry blended by mixing them in an orbital mixer for about 5-10 minutes, depending on the batch size. After dry blending, the combined mixture is typically placed in a rotational tumbler, and water is sprayed on the tumbling dry mixture until a wet sand texture is achieved. The wet blended mixture is then spread out in a thin layer and allowed to dry, typically for about 24 hours. The dried material is then screened using screen sizes 18 and 30 or 18 and 40. Finally, the dried material is blended with amalgamated zinc alloy powder (uncoated) in a ratio of, for example, of from about 1:1 to about 3:1, and preferably about 2:1 (uncoated: coated).

As used herein, the term "anode blend" is meant to include all of the components that go into making the coated metal anode; that is, "anode blend" includes the anode active material, the gelling agent, the ionically conductive clay additive, if present, and any other optional components, such as a wetting agent, electronic conducting polymer and/or a corrosion inhibitor.

The Gelled Anode Formation

Generally speaking, the gelled anode for use in the electrochemical cell of the present disclosure is formed by combining the coated metal anode with the surfactant-based electrolyte solution. More specifically, the coated metal anode is dry-dispensed into the cell and then the surfactant-based alkaline electrolyte solution is dispensed onto the coated metal anode and absorbed. Once the surfactant-based alkaline electrolyte solution has been absorbed by the coated metal anode, the cell may be mechanically closed.

Generally, the gelled anode comprises from about 70% (by weight) to about 90% (by weight) coated zinc anode, and from about 10% (by weight) to about 30% (by weight) surfactant-based alkaline electrolyte solution.

While the present disclosure has been described and illustrated in combination with an zinc-air button cell, an ionically conductive clay additive of the present disclosure may be added to any zinc-based anode in any type of electrochemical cell including, but not limited to, zinc-manganese dioxide cells, zinc-silver oxide cells, metal-air cells including zinc in the anode, nickel-zinc cells, rechargeable zinc/alkaline/manganese dioxide (RAM) cells, zinc-bromide cells, zinc-copper oxide cells, or any other cell having a zinc-based anode. It should also be appreciated that the present disclosure is applicable to any suitable cylindrical metal-air cell, such as those sized and shaped, for example, as AA, AAA, AAAA, C, and D cells.

Having described the disclosure in detail, it will be apparent that modifications and variations are possible without departing the scope of the disclosure defined in the appended claims. Furthermore, it should be appreciated that all examples in the present disclosure are provided as non-limiting examples.

EXAMPLE 1

In this Example, the high rate discharge of size 13 zinc-air electrochemical cells containing a modified ionically conductive clay additive (fluorine-containing ionically conductive clay additive SR 2477 (Rockwood Specialties Inc., Princeton, N.J.) in the anode were compared to: (1) zinc-air electrochemical cells that contained an unmodified (i.e., un-halogenated) ionically conductive clay additive in the anode (Laponite® RD (Rockwood Specialties Inc., Princeton, N.J.); and (2) zinc-air electrochemical cells that did not contain an ionically conductive clay additive in the anode (control).

The anodes of the size 13 zinc-air electrochemical cells we constructed by fabricating the electrolyte and the coated metal anode separately, and then combining the two to form the gelled anode as described above. For all cells evaluated, the electrolyte fabrication included the components and amounts set forth in Table 3:

TABLE 3

| Potassium Hydroxide (33% Solution) | Carbopol ®* 907 | Alkaterge TIV** | Zinc Oxide |
|---|---|---|---|
| 0.09 grams | 0.1% (by weight KOH) | 0.2% (by weight KOH) | 2% (by weight KOH) |

*Carbopol products are commercially available from Noveon (Cleveland, Ohio)
**Alkaterge TIV is commercially available from ANGUS Chemical (Buffalo Grove, Illinois)

For all cells evaluated, the coated metal anodes were fabricated to include 0.37 grams of amalgamated zinc commercially available from Grillo-Werke Aktiengesellschaft (Germany) and 0.33% (by weight anode blend) magnesium oxide. Along with the amalgamated zinc and magnesium oxide, the coated metal anode for the control cell (no ionically conductive additive) additionally contained 0.33% (by weight anode blend) Carbopol® 934. The coated metal anodes for producing the electrochemical cells including the modified ionically conductive additive included, in addition to the amalgamated zinc and magnesium oxide, 0.33% (by weight anode blend) of a 50-50 weight ratio combination of SR 2477 and one of three gelling agents including Carbopol® Ultrez 10, Carbopol® Ultrez 21 or Carbopol® 934. The coated metal anodes for producing the electrochemical cells including the unmodified ionically conductive additive included, in addition to the amalgamated zinc and magnesium oxide, 0.33% (by weight anode blend) of a 50-50 weight ratio combination of Laponite® RD and one of three gelling agents including Carbopol® Ultrez 10, Carbopol® Ultrez 21 or Carbopol® 934.

The gelled anodes for use in the electrochemical cells were produced by combining the electrolyte and the coated metal anodes as described herein. The cathodes of all electrochemical cells evaluated were conventional metal air cathodes as described herein and known to one of ordinary skill in the art.

The fabricated zinc-air electrochemical cells and controls cells were stored with adhesive tabs for four months at about 70° F. and 50% relative humidity prior to testing. Following this storage period, the electrochemical cells were subjected to a high rate discharge using a 150 ohm resistor. The current capacity in milliamp-hours (mAh) was then measured for each of the zinc-air electrochemical cells containing an ionically conductive clay additive (n=5) and zinc-air control cells without an ionically conductive clay additive (n=10). The measured capacities were averaged, and the results are illustrated in Table 3 below:

TABLE 3

| Sample | Discharge Capacity (mAh) |
|---|---|
| Control (no ionically conductive additive): Carbopol ® 934 | 535.8 |
| SR 2477: Carbopol ® Ultrez 21 | 584.6 |
| SR 2477: Carbopol ® Ultrez 10 | 590.5 |
| SR 2477: Carbopol ® 934 | 534.7 |
| Laponite ® RD: Carbopol ® Ultrez 21 | 477.5 |
| Laponite ® RD: Carbopol ® Ultrez 10 | 462.2 |
| Laponite ® RD: Carbopol ® Carbopol 934 | 362.5 |

As illustrated in Table 3, the zinc-air electrochemical cells containing unmodified Laponite® RD generally exhibited a lower discharge capacity when combined with any of the gelling agents, as compared to the control cell. This is thought to be due to the general instability of unmodified Laponite® RD in the zinc-air electrochemical cell environment over extended periods of time. By comparison, the zinc-air electrochemical cells containing the fluorinated SR 2477 exhibited excellent high rate discharge capacities after four months. Specifically, when combined with Carbopol® Ultrez 10, the zinc-air electrochemical cells containing SR 2477 exhibited about a 10% increase in high rate discharge capacity as compared to the control cell. When combined with Carbopol® Ultrez 21, the zinc-air electrochemical cells containing SR 2477 exhibited about a 9% increase in high rate discharge capacity as compared to the control cell. Additionally, the zinc-air electrochemical cells containing SR 2477 and any of the gelling agents exhibited an 18-20% increase in high rate discharge capacity as compared to the zinc-air electrochemical cells containing unmodified, non-fluorinated Laponite® RD.

What is claimed is:

1. An electrochemical cell comprising a gelled anode comprising a gelling agent, an anode active material comprising zinc, and an ionically conductive clay additive that is dispersed throughout the gelled anode, wherein the ionically conductive clay additive is present in an amount of from about 0.1% (by weight anode blend) to about 3% (by weight anode blend) and wherein the ionically conductive clay additive comprises at least about 25,000 ppm of a halogen.

2. The electrochemical cell as set forth in claim 1 wherein the ionically conductive clay additive comprises at least about 100,000 ppm of a halogen.

3. The electrochemical cell as set forth in claim 1 wherein the halogen is fluorine.

4. The electrochemical cell as set forth in claim 1 wherein the halogen is chlorine.

5. The electrochemical cell as set forth in claim 1 wherein the halogen is bromine.

6. The electrochemical cell as set forth in claim 1 wherein the ionically conductive clay additive is a natural clay.

7. The electrochemical cell as set forth in claim 1 wherein the ionically conductive clay additive is a synthetic clay.

8. The electrochemical cell as set forth in claim 1 wherein the ionically conductive clay additive is selected from the group consisting of kaolinite clays, montmorillonite clays, smectite clays, illiet clays, chlorite clays, bentonite clays, hectorite clays, and combinations thereof.

9. The electrochemical cell as set forth in claim 1 wherein the anode active material comprising zinc is an amalgamated zinc composition including mercury.

10. The electrochemical cell as set forth in claim 1 wherein the anode active material comprising zinc comprises an alloy of zinc and lead.

11. The electrochemical cell as set forth in claim 9 wherein the amalgamated zinc composition comprises from about 0.5 parts mercury per 100 parts zinc to about 6.0 parts mercury per 100 parts zinc.

12. The electrochemical cell as set forth in claim 9 wherein the amalgamated zinc composition comprises about 2.4 parts mercury per 100 parts zinc.

13. The electrochemical cell as set forth in claim 9 wherein the mean particle size of the amalgamated zinc composition is from about 300 micrometers to about 320 micrometers.

14. The electrochemical cell as set forth in claim 9 herein the median particle size of the amalgamated zinc composition is from about 250 micrometers to about 260 micrometers.

15. The electrochemical cell as set forth in claim 1 wherein the gelling agent is present in an amount of from about 0.1% (by weight anode blend) to about 3% (by weight anode blend).

16. The electrochemical cell as set forth in claim 15 wherein the gelling agent is selected from the group consisting of carboxymethylcellulose, polyacrylic acid, sodium polyacrylate, and combinations thereof.

17. The electrochemical cell as set forth in claim 1 further comprising from about 0.1% (by weight anode blend) to about 2% (by weight anode blend) magnesium oxide.

18. The electrochemical cell as set forth in claim 1 wherein the gelled anode further comprises an electrolyte solution comprising water, an alkaline solution, a suspending agent, a surfactant, and zinc oxide.

19. The electrochemical cell as set forth in claim 18 wherein the surfactant is an oxazoline surfactant.

20. The electrochemical cell as set forth in claim 18 wherein the electrolyte solution comprises from about 20% (by weight) to about 50% (by weight) potassium hydroxide, about 2% (by weight) zinc oxide, about 0.1% (by weight) suspending agent, and about 0.2% (by weight) surfactant.

21. The electrochemical cell as set forth in claim 18 further comprising an electronic conducting polymer selected from the group consisting of polyaniline, polypyrrole, polyacetylene, and combinations thereof.

\* \* \* \* \*

UNITED STATES PATENT AND TRADEMARK OFFICE
CERTIFICATE OF CORRECTION

| | | |
|---|---|---|
| PATENT NO. | : 7,563,537 B2 | Page 1 of 1 |
| APPLICATION NO. | : 11/290753 | |
| DATED | : July 21, 2009 | |
| INVENTOR(S) | : Paul Pratt | |

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by (652) days Delete the phrase "by 652 days" and insert -- by 885 days --

Signed and Sealed this

Sixth Day of July, 2010

David J. Kappos
*Director of the United States Patent and Trademark Office*